United States Patent Office 3,537,970
Patented Nov. 3, 1970

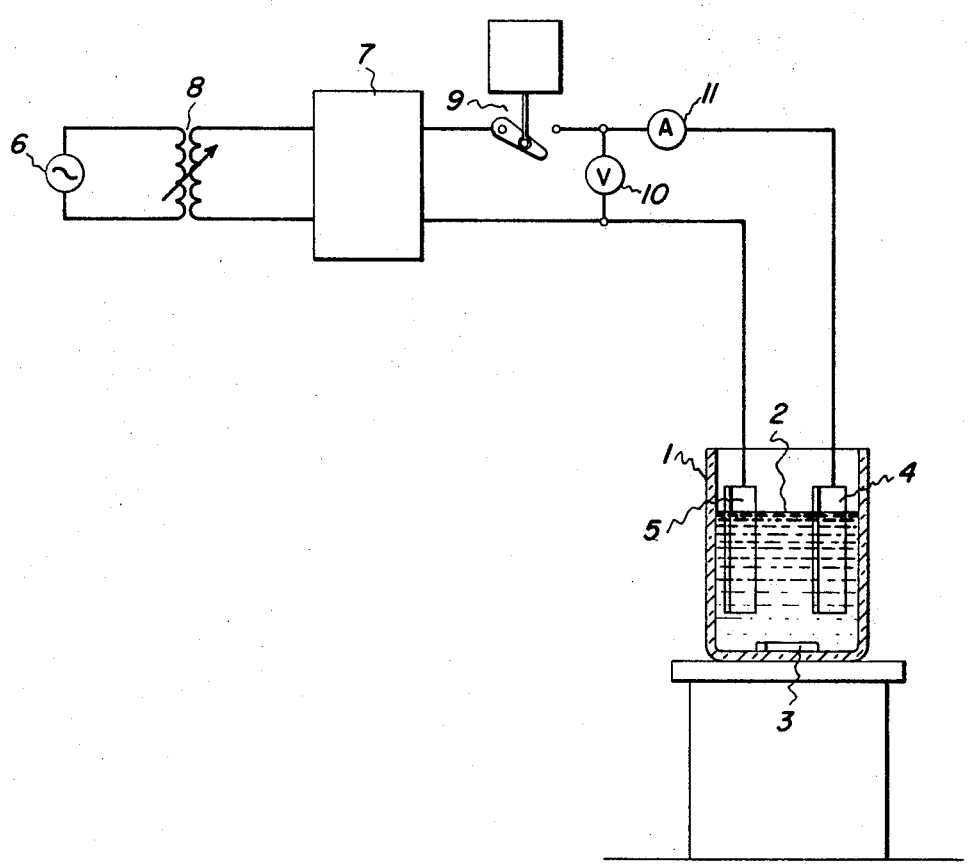

3,537,970
**PROCESS FOR ELECTRODEPOSITING
A POLYAMIDE ACID**
Fred F. Holub, Scotia, and Richard F. Gaertner, Rexford, N.Y., assignors to General Electric Company, a corporation of New York
Original application May 5, 1966, Ser. No. 547,889, now Patent No. 3,448,068, dated June 3, 1969. Divided and this application Jan. 13, 1969, Ser. No. 810,884
The portion of the term of the patent subsequent to Apr. 21, 1987, has been disclaimed
Int. Cl. B01k 5/02; C23b 13/00
U.S. Cl. 204—181          4 Claims

ABSTRACT OF THE DISCLOSURE

A process is provided for effecting the deposition of a polyamide acid onto an electrically conducting substrate, where the polyamide acid is formed by allowing a dianhydride, such as a carbonyldiphthalic-carboxylic acid dianhydride and a diamine, such as an arylenediamine to interact at ambient temperatures while dissolved in a phenol and water mixture.

---

This application is a division of our copending application Ser. No. 547,889, filed May 5, 1966, now Pat. No. 3,448,068, entitled "Polymer Solutions and Methods for Preparing and Using the Same."

This invention relates to synthetic polymer compositions and methods for preparing such materials. More particularly, the invention is concerned with a process for making a polyamide acid solution which comprises (1) dissolving a mixture of ingredients comprising (a) at least one carbonyldiphthalic carboxylic acid dianhydride (hereinafter referred to as "dianhydride") selected from the class consisting of the various benzophenone dianhydrides (e.g., 2,2',3,3'-, 2,3,3',4'-, 3,3',4,4'-benzophenonetetracarboxylic acid dianhydride) and a dianhydride having the formula (I)

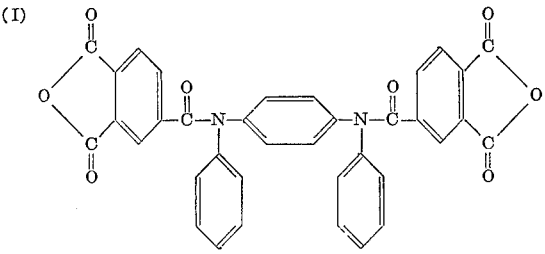

with (b) at least one diamine selected from the group consisting of $C_{2-8}$ alkylenediamines, m-phenylenediamine, and diamines having the formula

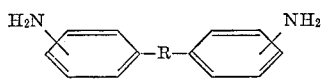

where R is a divalent radical selected from the group consisting of $C_{1-3}$ alkylene,

—O— and

in a solvent mixture composed of phenol and water in which the water is present in an amount equal to at least about 12 percent, by weight, based on the total weight of the phenol and water, the amount of water being so employed as to maintain the solution in a liquid condition at ambient temperatures, and (2) allowing the reactants to interact at a temperature below 40° C., e.g., from 20° C. to ambient temperatures, such as 25 to 30° C., to form the polyamide acid substantially free of any polyimide groups derived from the polyamide acid. The invention also includes the incorporation of ammonium compounds to permit the use of larger amounts of water in the solvent (in excess of 29 percent, by weight) and to enable such solutions to be employed for electrocoating of substrates.

U.S. Pat. 3,179,614, issued Apr. 29, 1965, describes a class of resins comprising polyamide acid resins which are generally prepared by the reaction of a dianhydride of a tetracarboxylic acid with various diamines. The most widely used dianhydride is pyromellitic dianhydride, although this patent does describe a number of other dianhydrides. In accordance with this patent, the dianhydride and the diamine are reacted in the presence of a number of recited organic solvents for both the reactants and the intermediate polymeric acid amide. In addition to reciting the need for employing solvents for the reaction which are relatively expensive and not readily available, this patent also points out that when making the polyamide acid in the solvent, anhydrous conditions should be observed. This has necessitated using solvents which have been distilled with great care and generally they have been sublimed in advance through silica gel and even through a dehydrating agent, such as phosphorus pentoxide, prior to using them in the reaction. This was generally considered necessary in order to avoid hydrolysis of the dianhydride. Moreover, the methods used to make the intermediate polyamide acids usually results in some imidization with problems of insolubility and possible precipitation of the polymer, even in these somewhat exotic solvents. Even if precipitation can be avoided, the usual presence of polyimide groups often requires higher temperatures of molding and shaping than are desirable.

It is therefore desirable that the polyamide acid remain fully soluble in the reaction solvent even at room temperature so as to permit the use of the solution for coating purposes, or that the highly fusible and soluble polyamide acid polymer can be isolated by precipitation or evaporation of the solvent, and recovered still in a soluble state substantially free of polyimide groups. After shaping or coating a substrate, the polyamide acid is readily converted to the polyimide form by chemical or thermal means to produce products having excellent solvent resistance and resistance to flow at elevated temperatures.

Unexpectedly it has been discovered that it is possible to prepare soluble polyamide acid resins without the necessity of using applied heat, which are substantially free of any polyimide groups. What is equally significant, it is possible to use a relatively inexpensive solvent, specifically phenol, to make the polyamide acid resin in solution and to still further reduce the cost of this solvent and to carry out the reaction at room temperature rapidly by the addition of water in amounts ranging from 12 to as high as 85 percent, by weight, based on the total weight of the phenol and water. The low solution viscosity of the phenol-water system polymer results in improved ability to impregnate porous materials, easier coating of wires by means of dies, etc., at a high solids content. This was entirely unexpected and in no way could have been predicted because it had been believed that anhydrous conditions should be observed in making the polyamide acid resin. The use of this relatively inexpensive mixture of phenol and water has obviated the necessity of using heat and expensive anhydrous solvents, for example, N-methyl-2-pyrrolidone, N,N-dimethyl-acetamide, etc., which are lost or recovered at considerable cost, thus adding to the cost of the intermediate polyamide acid resins and polyimide resins derived therefrom.

We have unexpectedly also discovered that we can use amounts of water with the phenol in excess of the above-stipulated approximately 29 weight percent if we incorporate in the solvent mixture an ammonium compound of the class of ammonia or ammonium salts of organic monocarboxylic acids of the formula

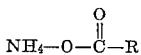

where R is a monovalent hydrocarbon radical (e.g., alkyl, aryl, alkaryl, and aralkyl), such as ammonium formate, ammonium acetate, ammonium propionate, ammonium butyrate, ammonium benzoate, etc. For example, we have found that by adding the ammonia (which term is intended to include the addition of the ammonia as ammonium hydroxide to the phenol-water solvent) we are able to increase the miscibility of the formed polyamide acid with the phenol-water solvent thereby allowing the use of larger amounts of water to obtain a homogeneous clear solution without deleteriously affecting the ability to use such solutions for the purposes intended. As a further advantage of incorporating the ammonium compound in the above-described polyamide acid solution, it is possible to use the solutions for electrocoating the polyamide acids on metal substrates. These electrically deposited films can then be cured by the application of heat (about 150–300° C.) to form adherent polyimide coatings that serve as electrical insulation at high temperatures or protect the finishes against corrosion.

The term "electrocoating" is intended to cover a process whereby organic coatings are formed on electrically conducting surfaces by the action of a DC electric current. The surface on which deposition of the organic material occurs functions as an electrode. This electrode in addition to another of opposite polarity, is immersed in an electrocoating bath of the type described in the present invention. Within the bath an imposed electric potential causes migration of the charged organic molecules, or in some cases, colloidal particles, to effect rapid deposition of the polyamide acid resins on the substrate being coated. In the present case, the electric coating bath was a polyacid amide solution in which negatively charged polymer molecules deposit on the anode.

The weight of the ammonium compound which can be added to the phenol-water solution to increase the miscibility of the polyamide acid with the phenol-water solvent can be varied widely. The addition of very small amounts caused a significant improvement in the ability to use more water and in the miscibility of the components. Thus, we may use the ammonium compound, calculated as ammonia, in amounts ranging from about 0.001 to 25 percent or more, by weight, based on the total weight of the phenol-water solvent. The following table shows the effect of adding 28 percent ammonium hydroxide to a phenol-water solution at 23° C. and the miscibility of phenol-water mixtures obtained thereby.

TABLE.—EFFECT OF NH₃ ON MISCIBILITY OF PHENOL-WATER MIXTURES

| Weight percent H₂O in phenol-water mixture: | | Weight percent NH₃ added to increase miscibility[1] |
|---|---|---|
| 30.0 | (immiscible) | 0 |
| 34.6 | (miscible) | 0.5 |
| 38.0 | (miscible) | 1.0 |
| 39.0 | (miscible) | 2.0 |

[1] Based on total weight of phenol-water solvent.

We have been able to use solvent mixtures composed of about 20 percent phenol and 80 percent water employing a sufficient amount of the ammonium compound to cause solubilization of the polyamide acid in the phenol-water mixture and miscibility of all the ingredients. The limit of miscibility is advantageously extended beyond that obtained in the absence of the ammonium compound additive by at least 25 or 30 percent in order to obtain maximum efficiency of the solution for electrocoating purposes. Of course it is obvious that the ability to use increased amounts of water further reduces the cost of the solvent and thus the cost of the polyamide acid solution. It is important that one employ phenol with the water since the use of other phenolic bodies such as, e.g., cresol, xylenol, etc., introduces an immiscibility factor when water is used with these materials.

As a still further precaution, the amount of water used with the phenol, when the ammonium additive is omitted, should range between 12 to 29 percent, by weight, based on the total weight of the phenol and water. If substantially less than 12 percent water is used, the solubility of the dianhydride and diamine reaction product is undesirably decreased requiring the application of heat to improve the solubility, with its attendant threat of polyimide formation. If too much water is used, a homogeneous solution is not obtained, but instead emulsions are formed, and in some instances when the water is used at high levels, a two-phase system occurs with obvious detriment to the polymer formation and utility of the mixture.

The amount of water used with the phenol should be sufficient to keep the phenol liquid at from 0° C. to room temperature (about 20 to 30° C.) without reducing the utility of the phenol as a solvent for the reaction of the dianhydride and the diamine. It is preferred that the water be in the range of about 15 to about 29 percent, by weight, when no ammonium compound is used, to maintain the phenol as a liquid at the above temperatures. It is also important that one employ benzophenone dianhydride or the dianhydride of Formula I with the diamine in order to obtain the above-described desired end results. If one employs instead of these dianhydrides, pyromellitic dianhydride (which is the preferred dianhydride in the above-mentioned U.S. Pat. 3,179,614) with the phenol-water mixture, not only are the reactants not soluble in the aforesaid mixture, but any polymer formed even when heated, will precipitate and thereby hinder the use of any reaction product for coating purposes where a clear homogeneous solution is required.

In carrying out the reaction, it is preferable to add the dianhydride to the diamine dissolved in the phenol-water mixture and allow the mixture to remain advantageously with stirring at ambient temperatures employing cooling if necessary to maintain the temperature of the mixture below 40° C. to avoid polyimide formation. The use of a continuous process for making these polyamide acids is especially served by the use of the phenol-water solvent because of the ability to effect cooling or refrigeration of the reaction mixture and to take advantage of the solubility of the reactants and intermediate polyamide acid in the phenol-water solvent and the low cost of the solvent mixture.

The various diamines which have been found useful for reacting with the above two described dianhydrides are the various alkylenediamines, especially those in which the alkyl group contains from 2 to 8 carbon atoms, e.g., ethylenediamine, propylenediamine, butylenediamine, 2-methylpropylenediamine, 1,2-diaminobutane, pentamethylenediamine, hexamethylenediamine, heptamethylenediamine, octamethylenediamine, etc. Of the various diaminobenzenes, m-phenylenediamine will give polymers with the carbonyldiphthalic anhydrides which are soluble in the phenolic solvents. Of the various binuclear diamines, only those diamines in which one amino group is on each of the phenyl groups and the phenyl groups are separated by an alkylene, carbonyl, oxygen or sulfonyl radical will give polymeric products with the dianhydrides which are soluble in the water-phenol solvent. Typical examples of such diamines are the various isomeric ortho-, meta- and para-oxydianilines, e.g., 2,2'-oxydianiline, 3,3'-oxydianiline, 4,4'-oxydianiline, 2,3'-oxydianiline, 2,4'-oxydianiline, 3,4'-oxydianiline, etc., the alkylenedianilines, especially those in which the alkylene group has from 1 to 3 carbon atoms, e.g., methylenedianiline, ethylidenedianiline, ethylenedianiline, propylidenedianiline, propylenedianiline, etc., including the various ortho-, meta- and para-isomers thereof, the various ortho-, meta- and para-isomers of diaminobenzophenone, and the various ortho-, meta- and para-isomers of sulfonyldianiline. Of these diamines, m-phenylenediamine (MPD), ethylenediamine, hexamethylenediamine, 4,4'-oxydianiline (ODA), 4,4'-methylenedianiline (MDA), and 4,4'-sulfonyldianiline are the most readily available. The alkylenediamines generally produce polymeric imides with the carbonyldiphthalic anhydrides which have lower softening points and less resistance to oxidation at elevated temperatures than the polyimides prepared from the aromatic diamines listed above. Therefore, when such properties are required, it is preferred to use the aromatic diamines.

The initial temperature, before the addition of the anhydride, may be as low as is required to maintain a constant solution (advantageously around 15–25° C.). After the addition of the anhydride, the temperature usually rises 10 to 15 degrees, due to the fact that the reaction is exothermic. At these temperatures the addition reaction to form the polyamide acid is usually complete at the end of 15 minutes, as is shown by the increase in the viscosity of the reaction mixture. The cyclicization reaction to form the polymeric imides proceeds advantageously at a temperature of about 125° to 300° C. to form a clear flexible film when cast on a glass substrate. In applying coatings or depositing films from solution, the temperatures used to remove the phenol and water should be raised gradually to obtain smooth coatings and films.

Of the various dianhydrides, the most readily available and preferred dianhydride is 3,3', 4,4'-benzophenone tetracarboxylic acid dianhydride. These anhydrides may be made in the manner described in U.S. Pat. 3,078,279, McCracken et al.

In forming the polymeric products it is only required to mix one or more of the dianhydrides with one or more of the above named amines in the presence of the liquid aqueous-phenolic solvent; they go into solution rapidly and appear to react almost instantaneously to produce a viscous polymeric amide acid solution which remains liquid and homogeneous at room temperature. This polymer usually has an intrinsic viscosity of 0.18 to 0.30 at room temperature when measured in the phenol-water solvent used for making the polyamide acid (e.g., 20 percent water). If desired an inert atmosphere, e.g., nitrogen, can be used in the reaction vessel to retard oxidation of the amines to produce lighter colored polymers. Since the stoichiometric proportions are one mole of amine to one mole of the dianhydride, it is preferred to use essentially equimolar amounts of the dianhydride and the diamine, although a slight excess, e.g., 1.05 moles of the amine per mole of the dianhydride, is advantageously used. Monoamines such as aniline, p-biphenylamine, benzylamine, or anhydrides of a dicarboxylic acid, such as phthalic anhydride or maleic anhydride, or other reagents reactive with amines or carboxylic acids may be used to chain-stop or modify the polymers. These may be added at the start, during, or at the end of the polymer-forming reaction and may be used to react with any slight excess of either the diamine or dianhydride used initially.

The amount of aqueous phenolic solvent used should be sufficient to produce a homogeneous solution with the reactants and polyamide acid polymer, and yet not be too viscous so as to introduce handling problems. If too much phenol is used, the cost advantage over other more expensive solvents is reduced. Optimum concentrations are in the range of 5 to 40 percent, by weight, polymer to 60–95 percent, by weight, solvent mixture, based on the end-used.

In order that those skilled in the art may better understand how the invention may be practiced, the following examples are given by way of illustration and not by way of limitation. All percentages are, by weight, unless otherwise stated.

EXAMPLE 1

In this example, 2.16 grams m-phenylene diamine was dissolved at room temperature in 34.0 grams of a weight mixture of 80 percent phenol and 20 percent water to yield a clear solution; then 6.44 g. of powdered 3,3',4,4'-benzophenonetetracarboxylic dianhydride (BPDA) was added with stirring. The exothermic temperature rise was controlled to keep it below about 40° C. during a 15-minute period, yielding a clear, viscous, pale yellow polyamide acid solution substantially free of polyimide groups. The polyamide acid resin was composed of recurring units of the formula:

(II) 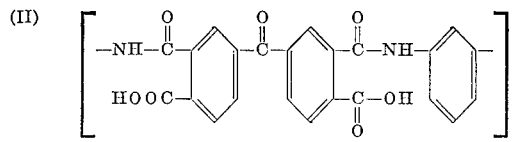

A sample of this solution was cast on a glass substrate and heated gradually for about 15 minutes at 30 to 300° C. to yield a tough, flexible, insoluble polyimide film composed essentially of recurring units of the formula:

(III) 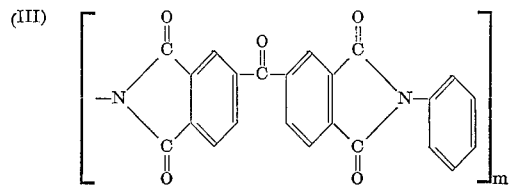

where $m$ is a positive integer in excess of 25.

EXAMPLES 2–19

In these examples, 3,3',4,4'-benzophenone dianhydride (identified as BPDA) was reacted with various organic diamines in the same manner as was done in Example 1 with the exception that the proportions of the reactants and of the phenol and water were varied in order to form solutions of polyamide acids. Again, care was exercised to counteract the exotherm of the reaction and to keep the temperature as close to room temperature as possible. Example 16 was modified to the extent that some of the phenol was substituted by cresol to illustrate the ability to substitute up to 25 weight percent cresol for the phenol. Example 19 employed pyromellitic dianhydride (identified as PMDA) in place of the benzophenone dianhydride and illustrates the difficulty encountered in using the PMDA in place of BPDA in the phenol-water solvent as evidenced by the fact that the intermediate polyamide acid reaction product precipitated. Examples 17 and 18 are illustrative of the fact that when 30 or 50 percent water was used without an ammonium compound, an emulsion or two-phase system, respectively, formed in contrast to the clear solutions obtained after 15 minutes in Examples 2 to 16. Table I shows the ingredients and proportions of ingredients used, and the kind of film which was derived by casting the intermediate resin solution on a glass substrate and thereafter gradually heating the cast film for about 15 minutes at a temperature of about 25–300° C. to volatilize the solvent and to form the polyimide final product. In each instance with the BPDA, a clear solution was obtained after 15 minutes.

The following example illustrates the ability to electrocoat polyamide acid solutions by the use of the above-described in the attached single figure drawing and comprised a glass electrocoating vessel 1 (in which deposition of the polymer 2 was made) supplied with means for agitation 3. The cathode 4 in each instance was a flat copper plate 2″ x 1″ x 1/16″, placed 4.5 cm. from the metallic surface to be coated, which was used as the anode 5. An AC voltage of about 110 volts was passed in at 6. Five volts from a 2-volt battery charger 7 attached

TABLE I

| Ex. | Solvent | | Dianhydride, grams | Diamine | | Cured film |
|---|---|---|---|---|---|---|
| | Grams | Percent of ingred. | | Grams | Type | |
| 2 | 35.0 | 80 phenol, 20 H₂O | 6.44 | 1.08 | m-Phenylenediamine | Flexible. |
| | | | | 2.0 | Methylenedianiline | |
| 3 | 35.0 | 80 phenol, 20 H₂O | 6.44 | 2.44 | 2,4-toluenediamine | Do. |
| 4 | 39.0 | 80 phenol, 20 H₂O | 6.44 | 2.32 | Hexamethylenediamine | Do. |
| 5 | 61.1 | 80 phenol, 20 H₂O | 12.88 | 2.40 | Ethylenediamine | Do. |
| 6 | 47.8 | 80 phenol, 20 H₂O | 6.44 | 5.52 | 1,3-bis(deltaaminobutyl)tetramethyldisiloxane | Do. |
| 7 | 52.2 | 80 phenol, 20 H₂O | 6.44 | 4.00 | Methylenedianiline | Do. |
| 8 | 44.8 | 80 phenol, 20 H₂O | 6.44 | 4.76 | 4,4′-sulfonyldianiline | Do. |
| 9 | 35.0 | 80 phenol, 20 H₂O | 6.44 | 2.16 | m-Phenylenediamine | Do. |
| 10 | 35.0 | 75 phenol, 25 H₂O | 6.44 | 2.16 | ___do___ | Do. |
| 11 | 12.9 | 80 phenol, 20 H₂O | 6.44 | 2.16 | ___do___ | Do. |
| 12 | 39.0 | 84 phenol, 16 H₂O | 6.44 | 2.32 | Hexamethylenediamine | Do. |
| 13 | 38.0 | 80 phenol, 20 H₂O | 6.44 | 2.00 | Oxydianiline | Do. |
| | | | | 1.08 | m-Phenylenediamine | |
| 14 | 38.0 | 80 phenol, 20 H₂O | 6.44 | 1.98 | Methylenedianiline | Do. |
| | | | | 1.08 | m-Phenylenediamine | |
| 15 | 39.0 | 80 phenol, 20 H₂O | 6.44 | 1.98 | Methylenedianiline | Do. |
| | | | | 1.16 | Hexamethylenediamine | |
| 16 | 35.0 | 70 phenol, 14.5 H₂O, 15.5 cresol. | 6.44 | 2.16 | m-Phenylenediamine [1] | Do. |
| 17 | 35.0 | 70 phenol, 30 H₂O | 6.44 | 2.16 | m-Phenylenediamine | |
| 18 | 35.0 | 50 phenol, 50 H₂O | 6.44 | 2.16 | ___do___ | |
| 19 | 34.0 | 80 phenol, 20 H₂O | 4.36 | 4.00 | Oxydianiline | |

[1] Stirred for 12 hrs. at room temperature, clear solution.

EXAMPLE 20

In this example, BPDA and the dianhydride of Formula I (which can be prepared by the reaction under heat of 4–chloroformyl phthalic anhydride and N, N′–diphenyl-paraphenylene diamine in a solvent of trichlorobiphenyl in accordance with the procedure described in the copending application of Fred F. Holub, Ser. No. 440,387, filed Mar. 17, 1965, now U.S. Pat. 3,440,215, and assigned to the same assignee as the present invention) were each reacted with various arylene diamines in the manner described in Example 1. After formation in each instance of a clear solution of the corresponding polyamide acid, the solution was cast on a glass substrate similarly as in Example 1 and the solvent removed by slowly increased heating for about 15 minutes at a temperature ranging upwardly from 25 to 300° C. In each instance, a clear, tough flexible film was obtained comprising a polyimide resin derived from the intermediate polyamide acid resin. The following Table II shows the varius ingredients used together with the proportions employed in each instance in making the corresponding polyamide acid.

TABLE II

| Ex. | Solvent | | Dianhydride | | Diamine | |
|---|---|---|---|---|---|---|
| | Grams | Ingredients | Type | Grams | Type | Grams |
| 20A | 34.4 | 84% phenol, 16% water. | BPDA | 6.44 | MPD | 2.16 |
| 20B | 41.0 | 84% phenol, 16% water. | BPDA | 6.44 | MDA | 4.0 |
| 20C | 14.3 | 84% phenol, 16% water. | DA | 3.04 | MPD | .54 |
| 20D | 16.0 | 84% phenol, 16% water. | DA | 3.04 | MDA | 1.0 |
| 20E | 41.0 | 84% phenol, 16% water. | BPDA | 6.44 | ODA | 4.0 |
| 20F | 34.4 | 84% phenol, 16% water. | BPDA | 6.44 | MPD | 2.16 |

NOTE.—MDA—methylene dianiline, MPD—meta-phenylene diamine, ODA—oxydianline, DA—dianhydride of Formula I.

to a 5-amp adjustable transformer 8 were applied between the cathode and the surface to be coated. As the load decreased with build-up of coating, the output voltage tended to increase thereby requiring control to maintain a constant voltage as the electric deposition progressed. Prior to coating, the sample to be coated was cleaned with steel wool, dipped in HCl, rinsed in water and then blown dry in nitrogen. The power was turned on before immersing the surface to be coated into the coating bath. The circuit contained a built-in timer switch 9 for controlling the time of deposition and appropriate instrumentation 10 and 11 for measuring the DC voltage and current, respectively. Successful coatings were obtained with anode materials made of copper (including copper wire), stainless steel, nickel, aluminum and brass. Uniform coatings were obtained on flat plates, round wires, and round bobbins used for relay coils.

EXAMPLE 21

In this example, the formation of the polyamide acid was substantially the same as that described in Example 1. The polyamide acid solution containing 70 percent phenol and 30 percent water was prepared with a 4 mole percent stoichiometric excess of the diamine over the BPDA. In each instance, the time for electrocoating was held to 5 minutes; maximum coating thickness for all practical purposes however was obtained after 30–60 seconds. Greater deposition rates and film thicknesses can be obtained at higher voltages, if desired. The following Table III shows the particular diamines used, the weights of each diamine, the amount of ammonium hydroxide used, and the kind of coating obtained. In each instance, the voltage was 5 volts for 5 minutes and the cure of the electrodeposited coating to form the polyimide resin was for 30 minutes at 90° C. and then for 30 to 45 minutes at 150° C.

TABLE III

| Sample No. | Wt. BPDA, grams | Diamine Kind | Diamine Wt., grams | Grams NH₄OH [1] | Grams phenol-water solvent | Remarks |
|---|---|---|---|---|---|---|
| 21A | 3.22 | MDA | 2.062 | 1 | 47.5 | Flexible film, 0.5 mil thick. Excellent coverage at corners. |
| 21B | 3.22 | MPD | 1.124 | 1 | 47.6 | Flexible film, 0.25 mil thick. Corner coverage satisfactory. |
| 21C | 3.22 | ODA | 2.082 | 1 | 47.6 | Same as in 21A. |
| 21D [2] | 3.22 | MDA | 2.062 | 1 | 47.6 | Adherent hard film, 0.25 mil thick. |
| 21E [3] | 3.22 | MDA | 2.062 | 1 | 47.6 | Do. |

[1] 28% NH₃.
[2] Ammonium compound was ammonium acetate.
[3] Ammonium compound was ammonium benzoate.

EXAMPLE 22

About 34.9 grams of distilled water and 60 grams of distilled phenol were mixed together. While agitating the mixture, 7.14 grams of ammonium hydroxide containing 28 percent, by weight, ammonia was added causing the former two-phase mixture to convert to a clear single phase liquid mixture in which the solvent was composed of 40 grams water, 60 grams phenol and 2.0 grams dissolved ammonia. To this latter solvent mixture was added with stirring 4.124 grams methylene dianiline and 6.444 grams benzophenone dianhydride which when interacted in the manner described in Example 1 yielded a clear solution of 9.55 percent solids of the corresponding polyamide acid resin. A film cast from the solution on a glass substrate and thereafter cured at 200° C. for 5 minutes produced a tough, clear flexible film of the corresponding polyimide resin. The above-described polyamide solution was used as a bath for electrocoating a copper surface in the same manner as was done in Example 21 employing 5 volts for about 5 minutes. The deposited film was heated at about 150–165° C. for 15 minutes to obtain a 0.2 mil film which was clear and flexible.

EXAMPLE 23

To 9.8 grams distilled water was added 2.5 grams ammonium hydroxide (28% NH₃), 14.8 grams phenol and 4.124 grams MDA, adding the ammonium hydroxide to the water before the phenol. After vigorously stirring the mixture, 6.44 grams of BPDA was added and the mixture again stirred for about 15 minutes while maintaining the temperature of the reaction mixture below 40° C. To the viscous polyamide acid solution obtained, was added 68.8 grams additional distilled water and 1 gram of the aforementioned ammonium hydroxide and the contents further stirred to give a final polymer solution in which the solvent composition consisted of 84.6% water and 15.4% phenol with the ammonia concentration being 0.93%, by weight, of the solution. A film cast from the solution on a glass substrate and cured for 4 minutes at 250° C. was tough and flexible. In addition, this homogeneous resin solution was stable at room temperature even after seven days, and continued to yield tough, flexible polyimide films. This polyamide acid resin solution was used to electrocoat films on copper at voltages up to 36 volts in the manner described in Example 21. After heating the electrocoated film for 4 minutes at 250° C., a tough, flexible polyimide film was obtained. One significant advantage in using a large concentration of water in the solvent was the fact that the "drip coat" adhering to the test piece after removal from the electrocoating bath and before curing to the polyimide stage, could be removed by rinsing with water without affecting the tough, compact, uncured electrocoated film adhering to the copper surface.

Although the utility of the polymer solutions of the present invention have been described in the above-mentioned patent principally in terms of applications as flexible films, it should be understood that these polymers may be used in other applications suitable for such compositions. Thus, these polyamide acid resins can be converted to polyimides and employed as insulation over a conducting core, often previously coated with another polymer, or vice versa, to give laminated, insulated coatings on the wire to improve the properties of the insulation. They may also be used as dipping varnishes to impregnate coils of previously insulated wire, i.e., in the motor and generator rotors, field coils, etc. These resins may also be used in molding powder formulations, by mixing with various fillers, for example, wood flour, diatomaceous earth, carbons, silica, abrasive grains, e.g., Carborundum, diamond grit, etc. These polymers are also useful in preparing fibers, as impregnants, and bonding materials for metallic and fibrous laminates, etc. The polymers in film form are suitable as a dielectric in making capacitors, as slot insulation in motors, etc.

It has been found that in accordance with the process herein described that it is possible to synthesize completely aromatic polyamide acids in inexpensive aqueous phenolic-water systems without resorting to any heating. This simple direct process allows the preparation of coating solutions that are easily prepared and have greater flexibility on application to glass and metal surfaces. Since substantially no heating is required, very simple mixing technique may be applied to produce a polymer solution useful for bonding glass fibers, for making laminations and for coating metal substrates for use as thermal and electrical insulating films.

It will of course be apparent to those skilled in the art that other benzophenone dianhydrides and other diamines may be employed in place of those recited in the foregoing examples, many illustrations of these reactants being given previously, without departing from the scope of the invention. The ratio of reactants as well as the proportions of the phenolic body and water may also be varied within the ranges recited above. It is also to be understood that the conditions of reaction, formation of intermediate polyamide acid, and of the ultimate polyimide product can also be varied widely in accordance with the intended invention. The incorporation of other additives, such as light stabilizers, oxidation inhibitors, levelling additives, etc., is not precluded.

The invention of broadly electrocoating surfaces with conducting mixtures such as solutions of polyamide acids is disclosed and claimed in the copending application of Fred F. Holub, Ser. No. 548,000, filed May 5, 1966 now U.S. Pat. 3,507,765, filed concurrently herewith, and assigned to the same assignee as the present invention.

What we claim as new and desire to secure by Letters Patent of the United States is:

1. In a process of effecting the deposition of a polyamide acid onto an electrically conducting substrate immersed in said polyamide acid, the improvement which comprises electrocoating the polyamide acid onto the substrate while the polyamide acid is in the form of a uniform mixture comprising (a) the polyamide acid, (b) phenol, (c) a base selected from ammonia, ammonium salts of monocarboxylic acids and mixtures thereof, and (d) water, where (a) is the product of reaction of at least one dianhydride selected from the class consisting of benzophenone dianhydride and a dianhydride of the formula:

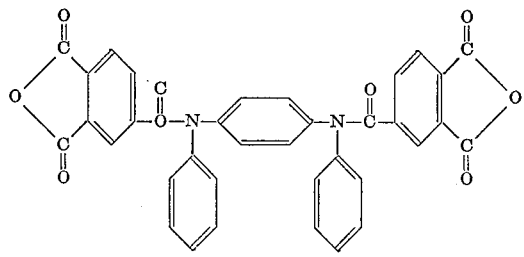

and at least one diamine selected from the group consisting of $C_{2-8}$ alkylenediamines, m-phenylenediamine, and diamines having the formula:

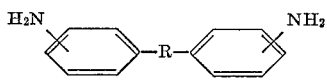

where R is a divalent radical selected from the group consisting of $C_{1-3}$ alkylene, —O— and 

2. A process in accordance with claim 1, where the polyamide acid is in the form of a solution.

3. The process as in claim 1 in which the electrically conducting substrate is copper.

4. The process as in claim 1 in which the electrically substrate is aluminum.

References Cited

UNITED STATES PATENTS 3,366,563  1/1968  Hart et al. _____ 204—181

HOWARD S. WILLIAMS, Primary Examiner